F. LEEPER.
TORCH STOVE.
APPLICATION FILED JULY 11, 1917.

1,257,716.

Patented Feb. 26, 1918.

Inventor:
Frank Leeper
by Arthur P. Knight
his Attorney.

UNITED STATES PATENT OFFICE.

FRANK LEEPER, OF LOS ANGELES, CALIFORNIA.

TORCH-STOVE.

1,257,716. Specification of Letters Patent. Patented Feb. 26, 1918.

Application filed July 11, 1917. Serial No. 179,869.

*To all whom it may concern:*

Be it known that I, FRANK LEEPER, a citizen of the United States, residing at Los Angeles, in the county of Los Angeles, State of California, have invented a new and useful Torch-Stove, of which the following is a specification.

This relates to a stove particularly adapted for use as a camp stove or portable stove and adapted to be heated by an ordinary gasolene torch.

The main object of the present invention is to provide a torch-stove adapted to effectively distribute and convey heat from the torch to the articles to be heated.

Another object of the invention is to provide for distribution of the heat to one or more of a plurality of stove elements and for regulation or control of the heat to each element.

Another object of the invention is to provide a simple, cheap and durable torch-stove.

A further object of the invention is to provide, in a stove of this kind, and in connection with the casing of the stove, a heating or warming chamber which is so constructed as to utilize space and heat, which would otherwise be wasted.

The accompanying drawings illustrate an embodiment of my invention and referring thereto:

Figure 1:
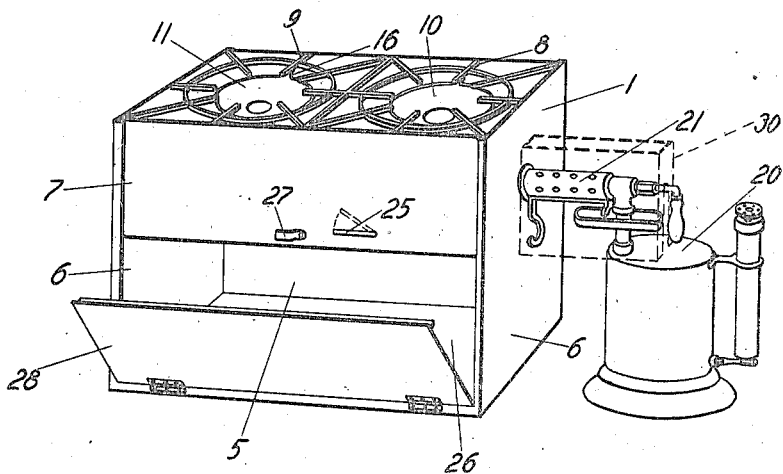
Figure 1 is a perspective view of the stove with the torch in position for heating the same.

The stove constituting my invention comprises a casing 1, formed preferably of sheet metal, such as galvanized iron, said casing being preferably rectangular in horizontal cross section and having a horizontal partition 2 dividing the casing into upper and lower portions 3 and 4. Said casing is provided with rear wall 5 and end walls 6 extending from top to bottom thereof and with a front wall 7 extending in front of the upper space 3, so that said upper space is closed at the bottom and at all sides, but is open at the top, suitable grids 8 and 9 being mounted at the top of the casing and extending over said space 3 to support the cooking utensils in position over the heat applying elements hereinafter described. Said heat applying elements consist preferably of bowl shaped or funnel shaped members 10 and 11 mounted respectively at the upper ends of risers or vertical tubes 12 and 13, which extend upwardly from a horizontal tube or flue 14 extending in the lower part of the chamber 3 and opening at one end into the outer air at 15 laterally of the casing. Said tube 14 and the portions 12, 13, 10 and 11 may be made in one piece, of cast-iron, for example, and the members 10 and 11 constitute expansions at the upper ends of the respective vertical tubes 12 and 13 and said members 10 and 11 may have upward projections or brackets 16, which are connected to the grids 8 and 9 respectively, by screws 19.

Figure 2:
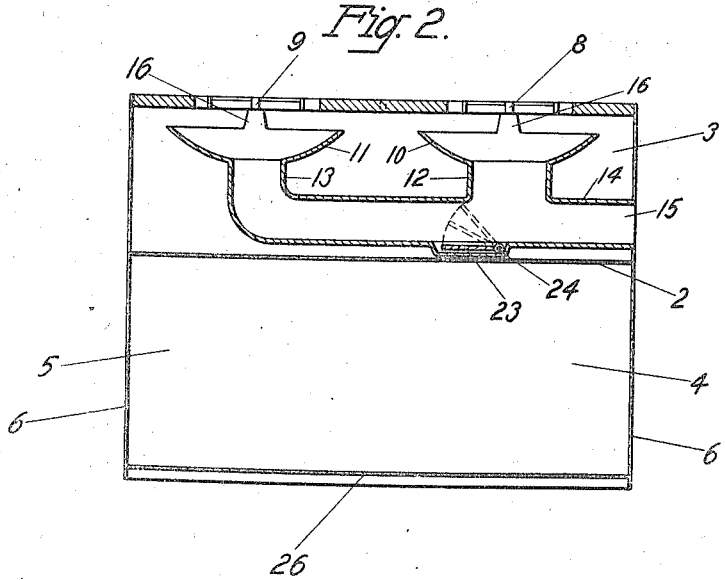
Fig. 2 is a longitudinal section of the stove.

The opening 15 of the heating tube 14 is preferably somewhat larger than the burner tube for an ordinary gasolene torch, so that when a torch, such as indicated at 20 in Fig. 1, is placed with its burner tube opposite the opening 15, the flame or blast from the torch will enter the tube 14 and the heat thereof will be distributed through said tube and the risers 12 and 13 to the respective heat applying elements 10 and 11. A valve or damper 23 is provided in the tube 14 between risers 12 and 13 and preferably near the first riser 12, said damper being pivoted at 24 and provided with a handle 25 outside of the casing, so as to enable it to be turned up to position shown in dotted line in Fig. 2 to deflect the hot gases upwardly through the first riser or to be turned down more or less so as to permit any desired portion of the hot gases to pass to the second riser 13.

The space 4 below the horizontal portion 2 is preferably used as a warming chamber being provided with a closed bottom plate 26 and with a door 28 hinged at its lower edge and adapted to be retained in closed position by a button or latch 27.

The casing 1 constitutes a frame or support, as well as an inclosure for the device, and the heat applying means is mounted on said frame, independently of the mounting or support of the torch, and on the other hand the mounting of the torch is independent of the casing or supporting frame for the heat applying means. This independent support of the heat applying means and the torch is a matter of great convenience in the operation of the device, as well as an element of safety, in that any sudden displacement of the said means will not be liable to overturn the torch; moreover the casing may be removed from the vicinity of the torch, for example, with the heated articles carried thereby, without disturbing the torch.

In the operation of the stove, the torch is started in operation in the usual manner and is then placed so that the blast therefrom enters the opening 15 of tube 14 and the hot gases or products of combustion pass along through said tube 14 and upwardly through one of both of the risers 12 and 13 and out through the heat applying elements 10 and 11, which distribute and direct such hot gases onto the utensils or articles to be heated; for example, cooking utensils. The amount of heat supplied to each heating element may be controlled by operation of the valve 23 as above described. I have found that in order to enable effective heating at both of the heating elements, it is desirable to make the riser 12 somewhat larger than the riser 13.

If the atmospheric conditions are so windy as to interfere with the starting of the torch in operation, a protector or shield indicated by dotted lines at 30, may be slipped over the torch temporarily until it is started, said shield being then withdrawn, so that the blast from the torch can enter the heat supply tube 14.

What I claim is:

1. A torch-stove comprising a casing and a grid mounted at the upper portion of said casing, adapted to support cooking utensils, a horizontally extending tubular member opening laterally through said casing to receive the blast from the torch, a riser extending upwardly from said tubular member and a heat distributing member at the upper end of said riser and below said grid.

2. A torch-stove comprising a casing, a plurality of grids at the upper portion thereof, adapted to support cooking utensils, a horizontally extending tubular member opening at one end laterally through the casing to receive the blast from the torch and having a plurality of risers and heat applying means at the upper end of the respective risers and below the respective grids, said heat applying means being formed as expansions of the respective risers and being adapted to distribute the heat from the risers to all parts of said grids.

3. A torch-stove comprising a casing, a plurality of grids at the upper portion thereof, adapted to support cooking utensils, a horizontally extending tubular member opening at one end laterally through the casing, to receive the blast from the torch and having a plurality of risers, heat applying means at the upper end of the respective risers and below the respective grids, and valve means in said tube between said risers for controlling the distribution of the heat from said blast to the respective heat applying elements.

4. In a torch-stove, a casing, a horizontally extending heat receiving tube opening laterally through said casing to receive the blast from said torch, a vertical tube extending upwardly from said heat receiving tube and a heat applying member formed as a bowl shaped expansion at the upper end of said vertical tube to apply heat therefrom to the articles to be heated, and a grid mounted on said heat applying member and extending over the same to support cooking utensils in position to be heated thereby.

5. A torch-stove comprising a supporting frame, a grid mounted thereon, a tubular member having a lateral opening and adapted to receive the blast from a torch, said tubular member being provided with an upwardly extending portion and with a heat distributing member at the upper end of said upwardly extending portion and below said grid.

6. In a torch-stove, a supporting frame and a heat receiving tube mounted thereon, having a lateral opening to receive the blast from a torch, a vertical tube extending upwardly from said heat receiving tube and a heat applying member formed as an expansion at the upper end of said vertical tube and a grid mounted on said frame and extending over said heat applying means and adapted to support the articles to be heated.

7. The combination with a torch, of a stove comprising a frame provided with heat applying means and with a horizontally extending tubular heat receiving means communicating with said heat applying means and having a lateral opening adapted to receive heat from a torch, said frame being provided with means adapted to support cooking utensils in position to be heated by said heat applying means and said torch being mounted independently of the frame of said stove.

In testimony whereof I have hereunto set my hand, at Los Angeles, California, this 6th day of July, 1917.

FRANK LEEPER.